(12) United States Patent
Pan et al.

(10) Patent No.: US 10,735,320 B2
(45) Date of Patent: *Aug. 4, 2020

(54) APPLICATION WIRE

(71) Applicant: Global Innovation Aggregators LLC., Pasadena, CA (US)

(72) Inventors: Ping Pan, San Jose, CA (US); Richard D. Gitlin, Little Silver, NJ (US)

(73) Assignee: K.Mizra LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,103

(22) Filed: Aug. 8, 2019

(65) Prior Publication Data

US 2019/0363980 A1    Nov. 28, 2019

Related U.S. Application Data

(63) Continuation of application No. 15/838,014, filed on Dec. 11, 2017, now Pat. No. 10,411,999, which is a continuation of application No. 14/919,687, filed on Oct. 21, 2015, now Pat. No. 9,843,509, which is a continuation of application No. 14/055,721, filed on
(Continued)

(51) Int. Cl.
*H04L 29/06* (2006.01)
*H04L 12/721* (2013.01)
*H04L 12/701* (2013.01)
*H04L 12/723* (2013.01)
(Continued)

(52) U.S. Cl.
CPC .............. *H04L 45/68* (2013.01); *H04L 45/00* (2013.01); *H04L 45/38* (2013.01); *H04L 45/50* (2013.01); *H04L 45/74* (2013.01); *H04L 47/24* (2013.01); *H04L 65/1013* (2013.01); *H04L 69/22* (2013.01)

(58) Field of Classification Search
None
See application file for complete search history.

(56) References Cited

U.S. PATENT DOCUMENTS 5,920,705 A   7/1999  Lyon et al.
6,167,051 A   12/2000 Nagami et al.
(Continued)

OTHER PUBLICATIONS

Afferton, Thomas S. et al., Ethernet Transport over Wide Area Networks.
(Continued)

*Primary Examiner* — Brandon M Renner
(74) *Attorney, Agent, or Firm* — Kinney & Lange, P.A.

(57) ABSTRACT

A method includes, at a node associated with a multiprotocol label switching system (MPLS) network, identifying information associated with an application flow based on one or more unencapsulated packet headers of the application flow or based on an ingress data stream that includes the application flow. The method further includes, in response to identifying the information, and based on stored data that maps application flows with pseudowires, determining a number of pseudowires corresponding to paths through the MPLS network, where the stored data indicates, for a sending device application, a distributed mapping of the application flow via at least one of the number of pseudowires, and communicating data related to the sending device application via at least one of the number of pseudowires.

20 Claims, 9 Drawing Sheets

Related U.S. Application Data

Oct. 16, 2013, now Pat. No. 9,197,675, which is a continuation of application No. 11/543,727, filed on Oct. 5, 2006, now Pat. No. 8,588,061.

(60) Provisional application No. 60/725,038, filed on Oct. 7, 2005.

(51) Int. Cl.
    *H04L 12/741*     (2013.01)
    *H04L 12/851*     (2013.01)

(56) References Cited

U.S. PATENT DOCUMENTS

| | | |
|---|---|---|
| 6,347,088 B1 | 2/2002 | Katou et al. |
| 6,430,184 B1 | 8/2002 | Robins et al. |
| 6,477,166 B1 | 11/2002 | Sanzi et al. |
| 6,546,427 B1 | 4/2003 | Ehrlich et al. |
| 6,574,477 B1 | 6/2003 | Rathunde |
| 6,621,793 B2 | 9/2003 | Widegren et al. |
| 6,665,273 B1 | 12/2003 | Goguen et al. |
| 6,680,943 B1 | 1/2004 | Gibson et al. |
| 6,751,684 B2 | 6/2004 | Owen et al. |
| 6,813,271 B1 | 11/2004 | Cable |
| 6,845,389 B1 | 1/2005 | Sen et al. |
| 6,985,488 B2 | 1/2006 | Pan et al. |
| 7,050,396 B1 | 5/2006 | Cohen et al. |
| 7,200,104 B2 | 4/2007 | Saleh et al. |
| 7,436,782 B2 | 10/2008 | Ngo et al. |
| 7,590,070 B1 | 9/2009 | Asawa et al. |
| 7,697,528 B2 | 4/2010 | Parry et al. |
| 9,843,509 B2 | 12/2017 | Pan et al. |
| 2001/0021175 A1 | 9/2001 | Haverinen |
| 2001/0023453 A1 | 9/2001 | Sundqvist |
| 2001/0043603 A1 | 11/2001 | Yu |
| 2002/0112072 A1 | 8/2002 | Jain |
| 2002/0141393 A1 | 10/2002 | Eriksson et al. |
| 2002/0146026 A1 | 10/2002 | Unitt et al. |
| 2003/0002482 A1 | 1/2003 | Kubler et al. |
| 2003/0039237 A1 | 2/2003 | Forslow |
| 2003/0117950 A1 | 6/2003 | Huang |
| 2004/0105459 A1 | 6/2004 | Mannam |
| 2004/0114595 A1 | 6/2004 | Doukai |
| 2004/0133692 A1 | 7/2004 | Blanchet et al. |
| 2004/0156313 A1 | 8/2004 | Hofmeister et al. |
| 2004/0174865 A1 | 9/2004 | O'Neill |
| 2004/0252717 A1 | 12/2004 | Solomon et al. |
| 2005/0018605 A1 | 1/2005 | Foote et al. |
| 2005/0044262 A1 | 2/2005 | Luo |
| 2005/0080890 A1 | 4/2005 | Yang et al. |
| 2005/0080911 A1 | 4/2005 | Stiers et al. |
| 2005/0093770 A1* | 5/2005 | de Bonet .............. G06F 13/387 345/10 |
| 2005/0220148 A1 | 10/2005 | Delregno et al. |
| 2005/0237927 A1 | 10/2005 | Kano et al. |
| 2005/0259586 A1 | 11/2005 | Hafid et al. |
| 2006/0002423 A1 | 1/2006 | Rembert et al. |
| 2006/0018252 A1 | 1/2006 | Sridhar et al. |
| 2006/0046658 A1 | 3/2006 | Cruz et al. |
| 2006/0047851 A1 | 3/2006 | Voit et al. |
| 2006/0090008 A1 | 4/2006 | Guichard et al. |
| 2006/0146832 A1 | 7/2006 | Rampal et al. |
| 2006/0227767 A1 | 10/2006 | Johnson et al. |
| 2006/0233167 A1 | 10/2006 | McAllister et al. |
| 2007/0038921 A1 | 2/2007 | Pekonen et al. |
| 2007/0053366 A1 | 3/2007 | Booth et al. |
| 2007/0070893 A1 | 3/2007 | Butenweg et al. |
| 2007/0127479 A1 | 6/2007 | Sinicrope et al. |
| 2007/0206607 A1 | 9/2007 | Chapman et al. |
| 2008/0031129 A1 | 2/2008 | Arseneault et al. |
| 2008/0144632 A1 | 6/2008 | Rabie et al. |

OTHER PUBLICATIONS

Afferton, Thomas S. et al., Ethernet Transport over Wide Area Networks, Packet-Aware Transport for Metro Networks, IEEE Communications Magazine, pp. 120-127, Mar. 2004.

Anderson, L. et al., LDP Specification, Network Working Group, Jan. 2001.

Blake et al. "An Architecture for Differentiated Services," Network Working Group, Dec. 1998.

Braden et al. "Integrated Services in the Internet Architecture: an overview," Network Working Group, Jun. 1994.

Bryant et al. "Pseudo wire Emulation Edge-to-Edge (PWE3) Architecture," Network Working Group, Mar. 2005.

Harry Newton, "Newton's Telecom Dictionary", 23rd Updated and Expanded Edition, p. 825,p. 239, Flatiron Publishing, New York, Mar. 2007.

International Search Report for PCT Application Serial No. PCT/US2006/039257, dated Apr. 18, 2007, 2 pgs. Final Office Action dated Mar. 9, 2010 for U.S. Appl. No. 11/543,727, 17 pages.

Martini, L. et al., Pseudowire Setup and Maintenance using the Label Distribution Protocol (LDP), Network Working Group, Apr. 2006.

Martini, Luca et al., Dynamic Placement of Multi Segment Pseudo Wires, PWE3 Working Group, Jun. 2006.

Martini, Luca et al., Encapsulation Methods for Transport of Ethernet over MPLS Networks, Network Working Group, Apr. 2006.

Martini, Luca et al., Internet Draft, Segmented Pseudo Wire, Network Working Group, Jul. 2007.

Martini, Luca et al., Pseudowire Setup and Maintenance using LDP, Network Working Group, Mar. 2005.

Martini, Luca, et al., Encapsulation Methods for Transport of Frame Relay Over Ethernet over MPLS Networks, Network Working Group, Feb. 2006.

McPherson et al., Pseudowire Emulation Edge to Edge (PWE3) Jun. 13, 2007.

Metz, Chris et al., Pseudowire Attachment Identifiers for Aggregation and VPN Autodiscovery, PWE3 Working Group, Feb. 25, 2006.

Pan, P. et al., Internet Draft, Pseudo Wire Protection, Jul. 2006.

Pan, Ping, Internet Draft, Dry-Martini: Supporting Pseudo-wires in Sub-IP Access Networks, Network Working Group, Jul. 2005.

Rosen, E. et al., BGP-MPLS IP Virtual Private Networks (VPN), Network Working Group, Feb. 2006.

Rosen, Eric C. et al., Internet Draft, PWE3 Congestion Control Framework, Network Working Group, Mar. 2004.

Shah, Flimanshu et al., Internet Draft, ARP Mediation for IP Interworking of Layer 2 VPN, L2VPN Working Group, Jul. 2007.

Theimer, T. et al, "Requirements for OAM Functionality in MPLS", Oct. 1999, Watersprings.

Vasseur, et al., Path Computation Element (pce), May 9, 2007, http://www.ietf.org/html.charters/pce.charter.html.

* cited by examiner

APPLICATION WIRE

CROSS REFERENCE TO OTHER APPLICATIONS

This application is a continuation of U.S. patent application Ser. No. 15/838,014, filed Dec. 11, 2017, and entitled "Application Wire," which is a continuation of U.S. patent application Ser. No. 14/919,687, filed Oct. 21, 2015, and entitled "Application Wire," which is a continuation of U.S. patent application Ser. No. 14/055,721, filed Oct. 16, 2013, and entitled "Application Wire," which is a continuation of U.S. patent application Ser. No. 11/543,727, filed Oct. 5, 2006, and entitled "Application Wire," which claims priority to U.S. Provisional Application No. 60/725,038, filed Oct. 7, 2005 and entitled "Application wire: mapping application streams to pseudo-wires." The entireties of these related applications are incorporated herein by reference.

BACKGROUND OF THE INVENTION

In recent years, network service providers have been upgrading and managing networks based on Multi Protocol Label Switching (MPLS) technology. MPLS has been deployed in most backbone networks. MPLS provides capabilities such as Quality of Service (QoS), redundancy, Operations Administration and Maintenance (OAM), and Virtual Private Network (VPN). MPLS is typically used to provision and manage data streams at individual flow levels. Each flow is known as a Label Switched Path (LSP). Existing MPLS systems typically handle data traffic at the Layer-3 (IP) level and below.

Some MPLS networks use Pseudowires to map Open System Interconnections (OSI) Layer-1 or Layer-2 traffic flows into "virtual circuits." A Pseudowire refers to the emulation of a Layer-1 or Layer-2 native service over a network. Examples of native services include Asynchronous Transfer Mode (ATM), Frame Relay, Ethernet Virtual Local Area Network (VLAN), Time Division Multiplexing (TDM), Synchronous Optical Network (SONET), Synchronous Digital Hierarchy (SDH), etc. In the control plane, the Pseudowires are maintained and managed using a simplified version of Label Distribution Protocol (LDP), the Target LDP. Each Pseudowire is associated with an MPLS label for packet forwarding and a control word for flow management.

Since existing MPLS networks only allow Layer-1 or Layer-2 connections to be mapped to Pseudowires in a one-to-one mapping, the system typically cannot guarantee the QoS for individual applications that generate application data in Layer-3 or above. QoS behavior in the application layer is sometimes different from the behavior in Layer-1 or Layer-2. For example, packet video streams can generally tolerate out-of-sequence delivery, and packet voice traffic can sometimes tolerate packet loss but is sensitive to packet delay. Existing Layer-1 and Layer-2 systems, however, typically do not address network-level QoS for these voice and video applications.

Some proposed IP-based models have been developed to address the QoS requirement associated with applications, but some issues remain. For example, the IntServ/RSVP model identifies connections by applications based on the IP addresses of the source and destination, the protocol type, and the protocol's source and destination port number (together known as the 5-tuple). Each connection is required to comply with a number of service parameters such as bandwidth consumption and delay budget. As a result, the intermediate nodes (such as the core routers) are required to store the identity of all the connections, perform deep packet inspection, and implement extensive QoS mechanisms to satisfy the service parameters for each flow. Network service providers tend to find this model limiting because it is not very scalable as the number of users grow.

The DiffServ model addresses the scalability problems associated with the IntServ/RSVP model. Instead of handling QoS on a per flow basis, the user applications are classified into a small number of uniformly defined traffic classes. Each data packet stores its traffic class information in its IP header. At each intermediate node, the packet receives appropriate QoS treatment according to its traffic class. Since DiffServ provides relative QoS, in order to guarantee QoS to a particular flow, the model typically requires the network bandwidth to be over-provisioned. Further, the model only incorporates a subset of available QoS technology, such as priority queuing and Random Early Discard (RED) in dealing with temporary traffic congestion. The model is often not applicable in networks where physical links cannot be sufficiently over-provisioned.

It would be useful to have a way to better manage application traffic over a carrier network without requiring changes to the intermediate nodes. It would also be desirable if QoS guarantee can be achieved at per-application flow level. Furthermore, the solution should to be scalable.

BRIEF DESCRIPTION OF THE DRAWINGS

Various embodiments of the invention are disclosed in the following detailed description and the accompanying drawings.

DETAILED DESCRIPTION

Figure 1:
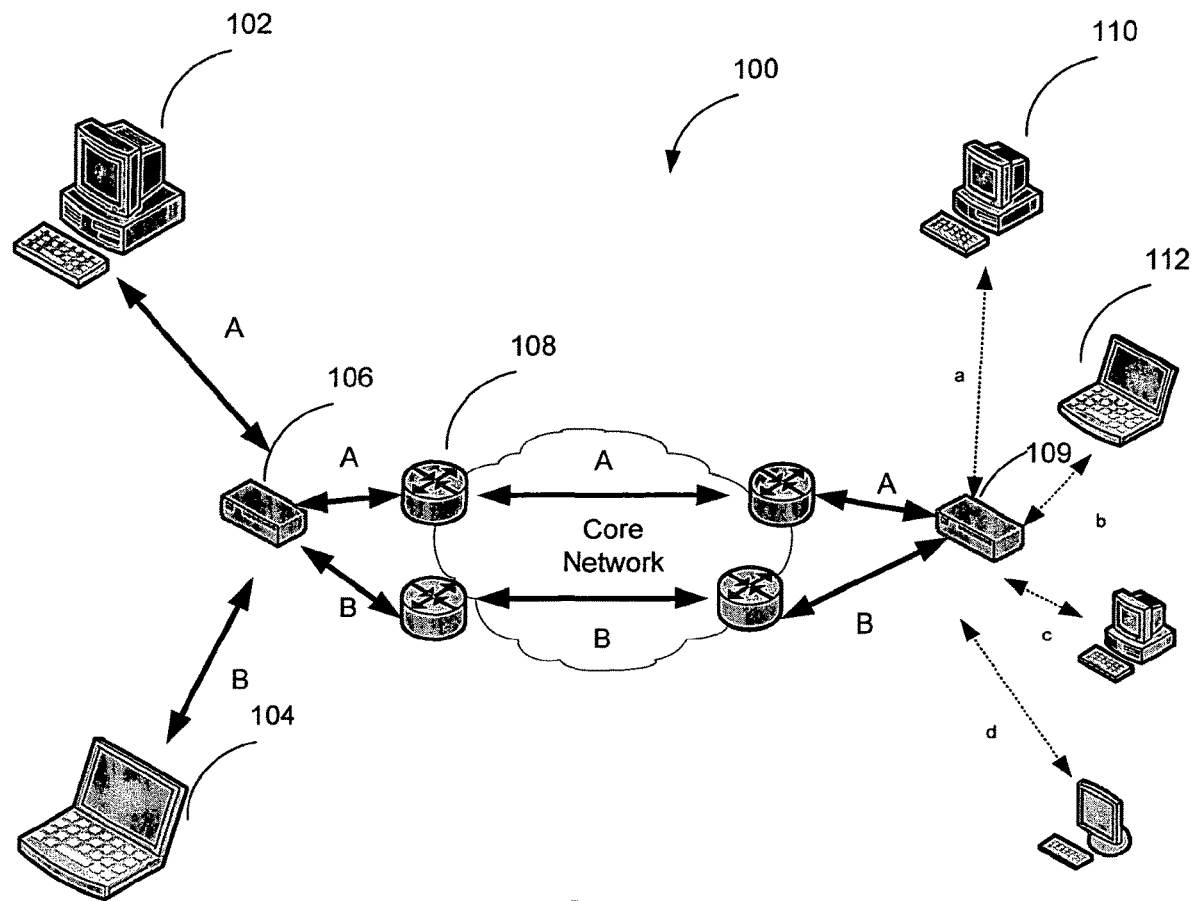
FIG. 1 is a system diagram illustrating an example of an MPLS based network supporting Pseudowires.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Transferring data over a network using Application Wires is disclosed. An Application Wire refers to the emulation of a virtual circuit or a transparent wire for transferring one or multiple application flows. An Application Wire maps one or more application flows into Pseudowires, and is at the same time aware of the application protocol and the protocol requirements associated with the application flows. As used herein, an application flow refers to a set of packets exchanged between two or more devices for accomplishing a specific function. Application flow data includes data associated with Layer-4 or above as defined by the OSI protocol stack. In some embodiments, an application flow includes data packets transmitted and received by an application, such as a Voice over IP (VoIP) session, instant messaging, Video-on-Demand (VoD), etc. The application may be configured to operate on various wired, wireless, or hybrid devices. The interface between the application and the underlying network is provided by protocols such as the Session Initialization Protocol (SIP) and the Real-time Transport Protocol (RTP). From the perspective of the application, transferring data over an Application Wire has the same effect as transferring data over a dedicated wire. As will be shown in more detail below, in some embodiments, Application Wires are formed by mapping application flows to Pseudowires.

FIG. 1 is a system diagram illustrating an example of an MPLS based network supporting Pseudowires. In this example, client devices such as 102 and 104 reside on an edge network and transfer data to an edge device (also referred to as an edge node) 106. The edge node, for example an edge router, supports MPLS and is capable of mapping Layer-1 and Layer-2 data streams into Pseudowires. Each data stream is mapped to a single Pseudowire in a one-to-one mapping. Each packet in the Pseudowire is encapsulated with an MPLS label for forwarding, and includes a control word for flow management. The edge device forwards the packet to a core network that includes core routers such as 108. The core network is compatible with MPLS and IP. The end user traffic flows are mapped to Pseudowires and then fed to the core network. The Pseudowires are maintained throughout the core network. The Pseudowires terminate at edge node 109, which receives the Pseudowire traffic and forwards the packets to their appropriate destinations such as devices 110 and 112. Traffic from devices such as 110 and 112 to devices such as 102 and 104 is processed similarly.

Since the mapping of one data stream to one Pseudowire does not account for the bandwidth demand of individual applications generating traffic on the client devices, it is often difficult to guarantee the quality of service (QoS) for these individual applications. For example, assuming that Pseudowires A and B each support a data rate of 50 Mbps, and that the application executing on device 102 require 70 Mbps of bandwidth while the application on device 104 only requires 20 Mbps. Because of the one-to-one mapping, the bandwidth requirement of device 102 is not met by Pseudowire, even though there is excess capacity on the network overall.

Figure 2:
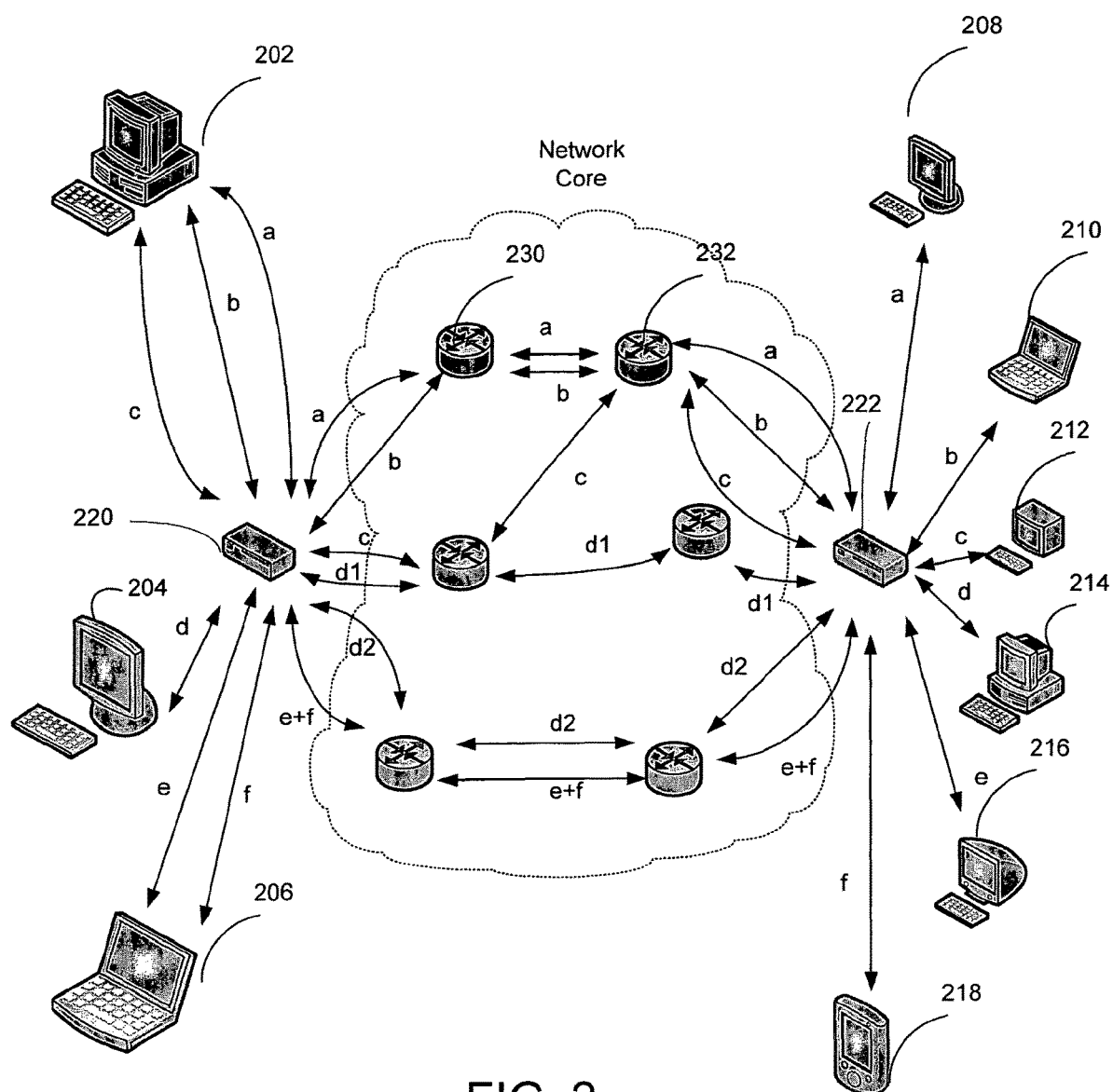
FIG. 2 is a system diagram illustrating an example of a network supporting Application Wires.

Application Wires improve on the Pseudowire scheme described above. FIG. 2 is a system diagram illustrating an example of a network supporting Application Wires. In this example, client devices 202-206 are configured to communicate with client devices 208-218 in the following manner: device 202 communicates with devices 208, 210, and 212; device 204 with device 214; device 206 with devices 216 and 218. Specifically, one or more applications executing on each client device send data to and receive data from applications executing on other client devices. Application flows a-f are shown between devices 202-206 and 208-218.

At the edge of the core network, edge nodes 220 and 222 are configured to transfer the data streams between a core network (such as a backbone network of a service provider) and the client devices. As used herein, data traffic is said to be in the ingress direction if it is being transferred from client devices to the core network, and in the egress direction if it is being transferred from the core network to clients devices. A data connection that transfers data in the ingress direction is referred to as a network-bound connection. Depending on the direction of the data flow, an edge node may be referred to as an ingress node or an egress node.

As will be shown in more detail below, the edge nodes map the application flows into Pseudowires in the ingress direction. A number of mapping schemes are possible, such as a one-to-one mapping, a distributed mapping where an application flow is mapped to multiple Pseudowires, or an aggregated mapping where multiple flows are mapped to a single Pseudowire. In the example shown, application flows a and b are one-to-one mapped to a separate Pseudowire each, application flow d is distributed to Pseudowires d1 and d2, and application flows e and f are aggregated to a single Pseudowire (e+f). The mapping scheme for each application flow is selected based at least in part on the bandwidth and traffic requirement associated with the application. In the egress direction, packets transferred on the Pseudowires are reassembled to the corresponding application flows and sent to the appropriate destinations. Each Pseudowire may span a plurality of intermediate nodes such as core routers 230 and 232. Unlike data transfer schemes where deep packet inspection is required at each intermediate node, the intermediate nodes used in this example can be standard MPLS devices and no change is required to make them support the Application Wire scheme.

Figure 3:
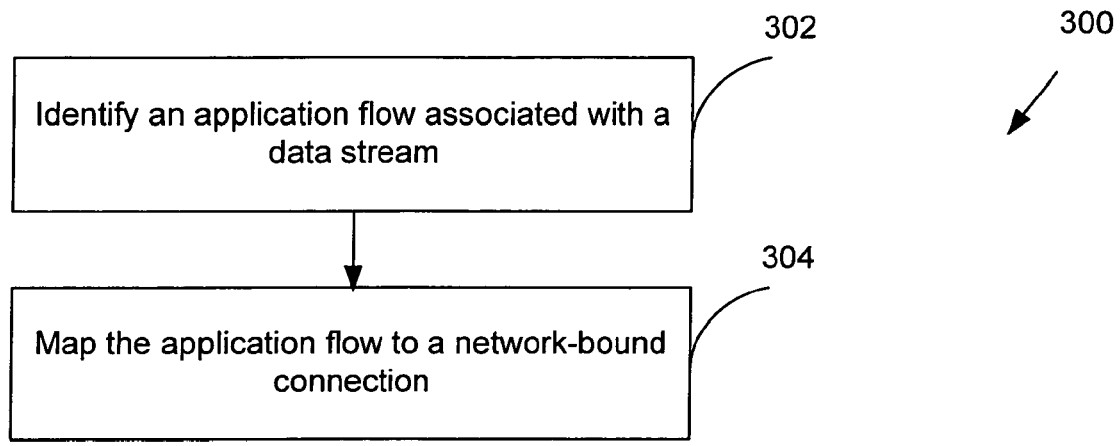
FIG. 3 is a flowchart illustrating an embodiment of a process for transferring data.

FIG. 3 is a flowchart illustrating an embodiment of a process for transferring data. Process 300 may be implemented on an edge node and can be used to process data streams in the ingress direction. In this example, the process initiates by identifying an application flow associated with a data stream being transferred over the network (302). Depending on the data stream, there may be one or more application flows within the same data stream. The identification may be achieved, for example, by inspecting the headers of the packets in the data stream. Further details of the identification process are discussed below. Once identified, the application flow is mapped to one or more network-bound connections such as Pseudowires (304) in accordance with the requirements of the application, forming one or more Application Wires.

Figure 4:
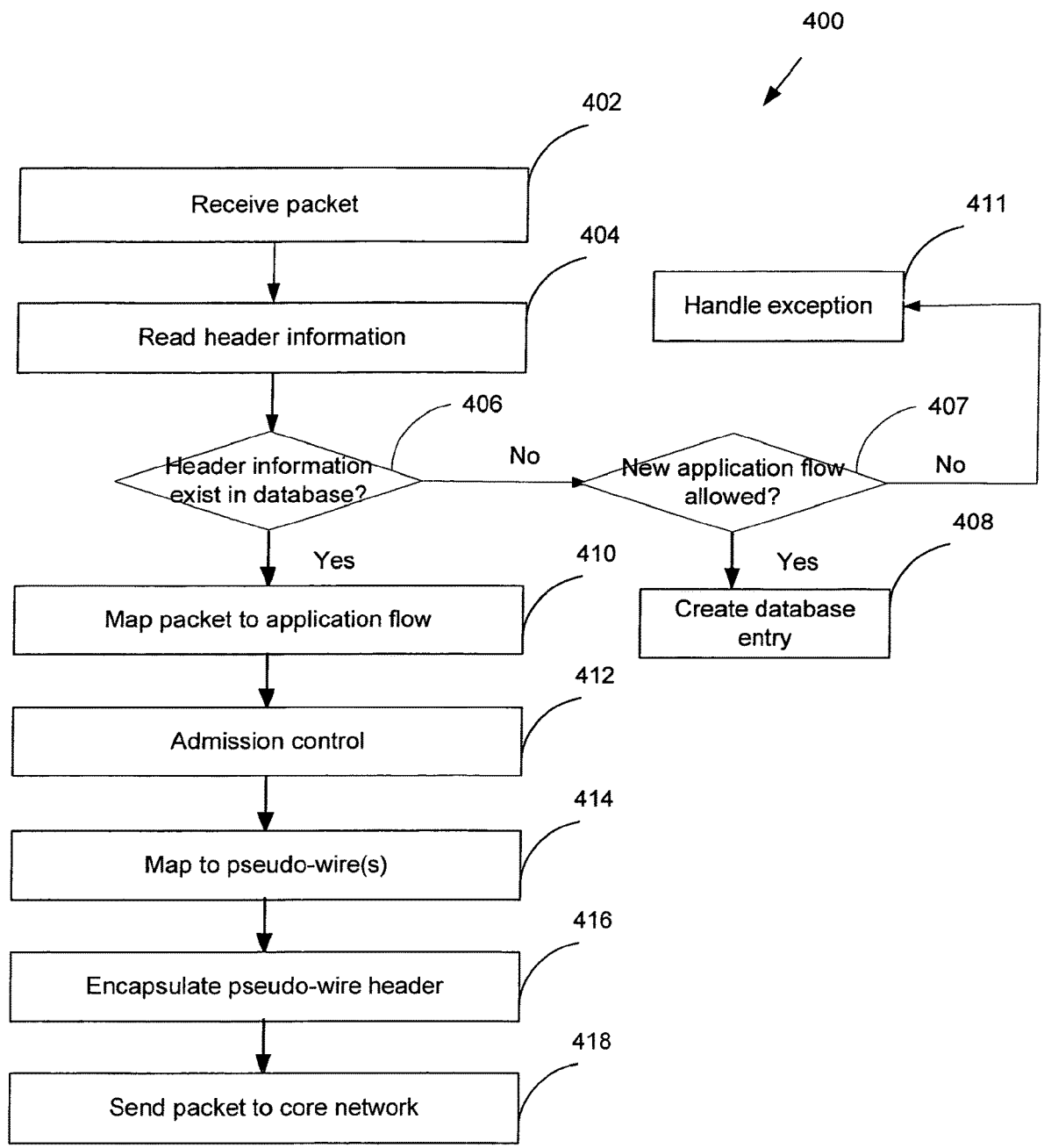
FIG. 4 is a flowchart illustrating another embodiment of a process for handling ingress data streams.

FIG. 4 is a flowchart illustrating another embodiment of a process for handling ingress data streams. Process 400 may be implemented on an edge node. In this example, process 400 initiates when a data packet is received (402). The header information of the received packet is read (404). The header information is used to identify the application flow. For purposes of example, it is assumed that the data stream carries IP data and that the data packet is an IP packet. Other types of data can be processed similarly based on the corresponding header formats. In this example, the IP packet includes a Layer-2 MAC header having fields such as the Ethernet addresses of the source and the destination. The IP packet further includes higher layer headers such as Layer-4 application protocol headers. The combination of various headers is used to identify specific application flows.

Figure 5:
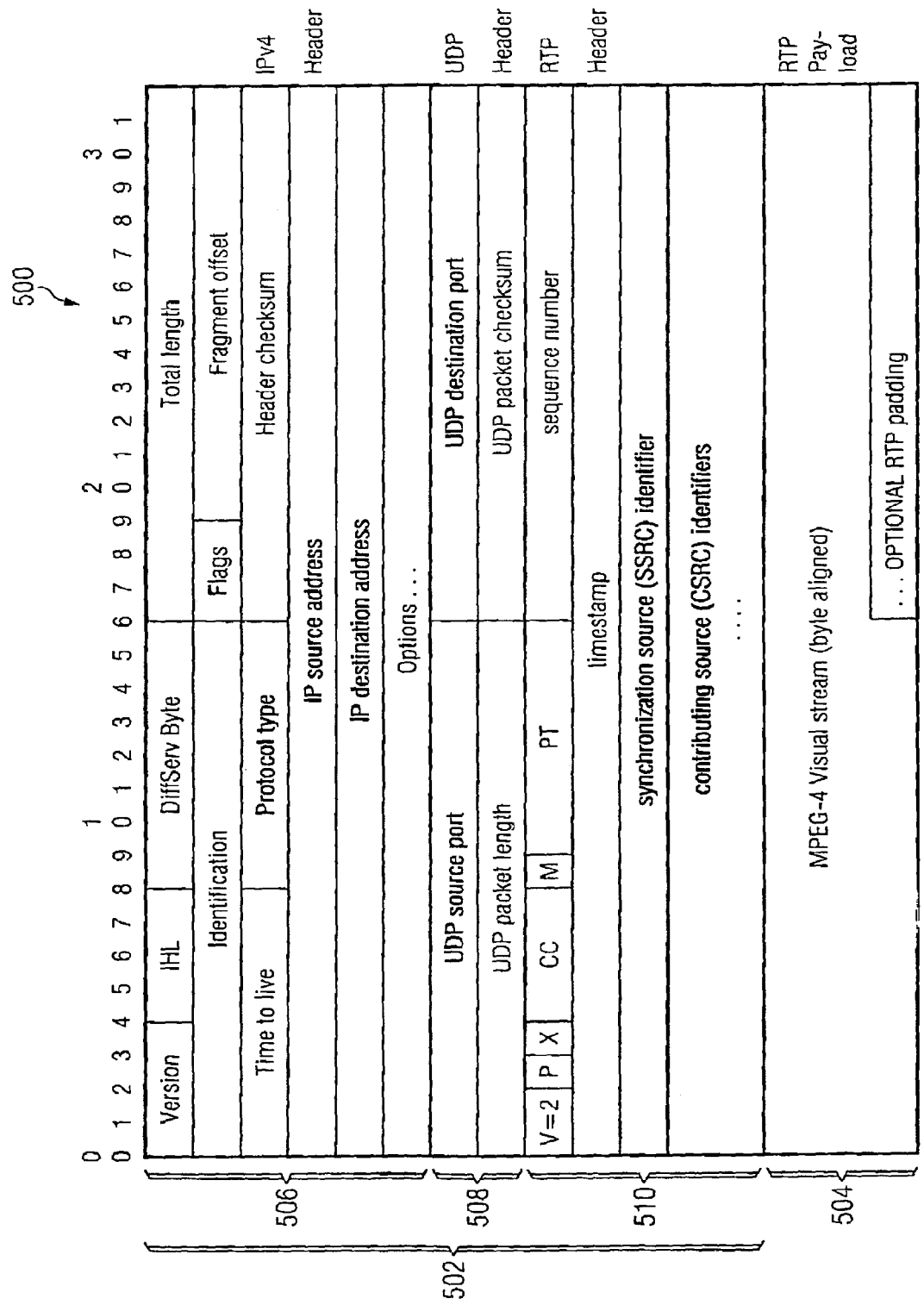
FIG. 5 is a diagram illustrating the format of a Real Time Protocol (RTP) packet example.

It is useful to inspect an example of a packet to understand how the application flow identification is done. FIG. 5 is a diagram illustrating the format of a Real Time Protocol (RTP) packet example. Packet 500 shown in the example is an MPEG-4 packet. It includes a header portion 502 and a payload portion 504. The header portion includes a Layer-3 (IPv4) header 506, and Layer-4 headers which in this case include UDP header 508 and RTP header 510. Several fields from each of the headers are extracted to provide information useful for identifying the application flow, including the IP source address and IP destination address, protocol type (which is UDP in this example), UDP source port, UDP destination port, synchronization source (SSRC) identifier, and contributing source (CSRC) identifier. Some of the fields are optional in some embodiments. Other types of applications such as Voice over IP or instant messaging can be identified using a similar technique, although different headers and fields may be used.

Returning to FIG. 4, the header information associated with the packet is looked up in a database of application flows (406). If the header information is not found in the database, it is determined whether a new application flow can be created based on the header information (407). If so, a new entry that includes information identifying the new application flow is created in the application flow database (408). If a new application flow cannot be created, the packet is discarded and appropriate error handling such as event logging is optionally performed. New application flows are disallowed in some embodiments where the system is configured to only allow pre-configured application flows.

If, however, the header information is found in the database, the packet is mapped to an application flow (410). Admission control is optionally performed on the flow (412). In various embodiments, admission control includes shaping traffic by changing the packets priority, applying a policy/rule, tagging, dropping the packet, etc. If the packet is not dropped by admission control, it is mapped to one or more Pseudowires configured to service the application flow (414). In some embodiments, a database of available Pseudowires is searched to find one or more suitable Pseudowires for carrying the application flow. The mapping is based on, among other things, IP routing or manual configuration.

As previously discussed, the mapping of application flow to Pseudowire may be one-to-one, N-to-one, or one-to-N. One-to-one mapping is the most straightforward. Sometimes multiple application flows are aggregated into a single flow (N-to-one). Aggregation is appropriate when, for example, the application flows are similar and have the same priority level. Sometimes, an application flow is distributed into multiple streams and transferred over the network via multiple Pseudowires (one-to-N). For example, a large flow exceeding a certain data rate threshold may be split into several Pseudowires to better utilize the available bandwidth. The division of the application flow into multiple streams is based at least in part on application-specific parameters. For example, a large RTP stream is sometimes split based on SSRC or pay-load frame type. In one example, an application flow involves a large RTP stream having a large amount of MPEG traffic over a network without any per flow QoS guarantee. To reduce the impact of dropped packets, the more important packets such as M-frames in the application flow are separated from the rest. The important packets are mapped to a Pseudowire with a higher priority level. The rest of the packets are mapped to one or more lower priority Pseudowires.

Figure 6:
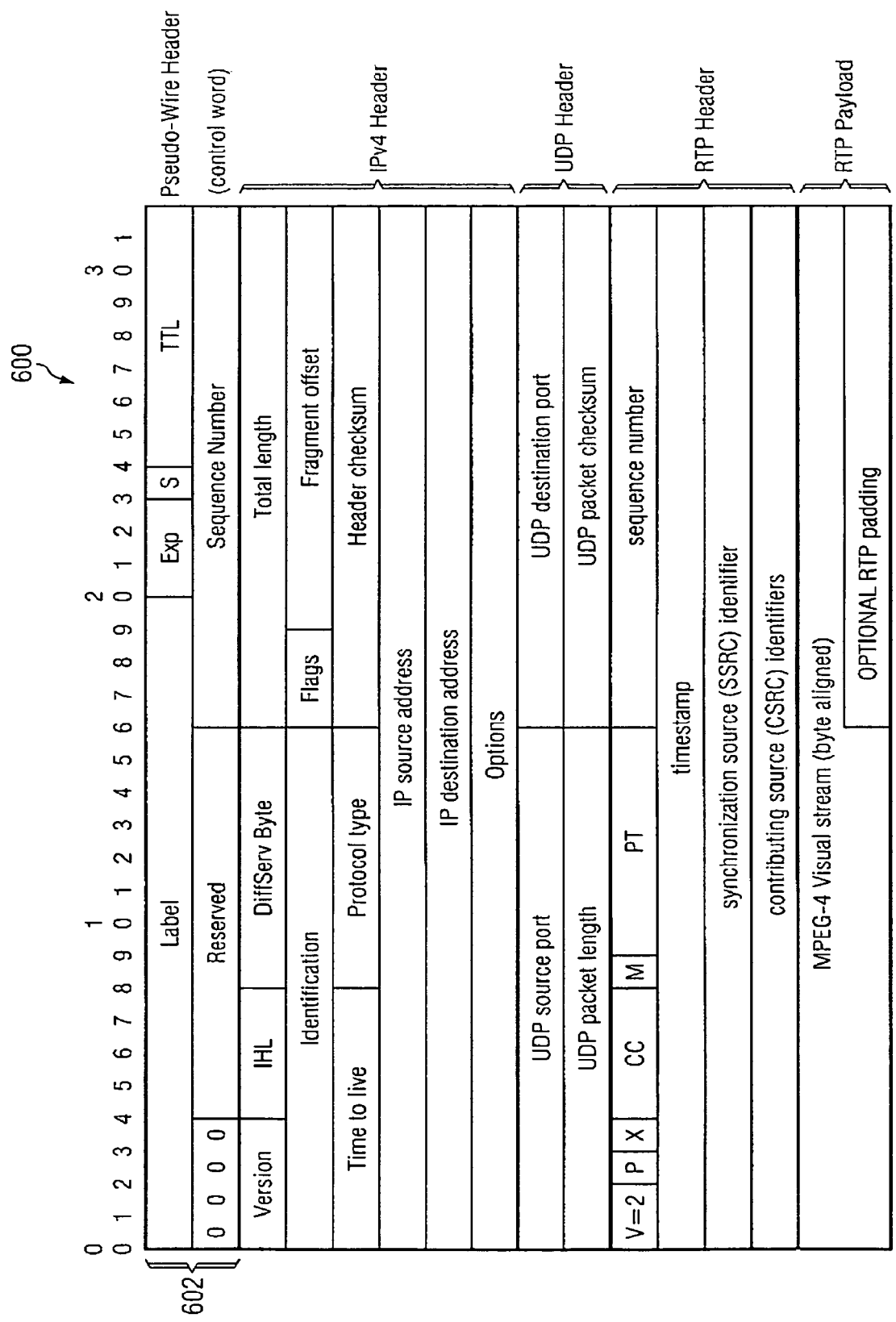
FIG. 6 is a diagram illustrating an example of a Pseudowire encapsulated MPEG-4 packet.

Returning to FIG. 4, once the appropriate Pseudowire for sending the packet is determined, the packet is encapsulated with a Pseudowire header (416) and sent to the core MPLS/IP network (418). FIG. 6 is a diagram illustrating an example of a Pseudowire encapsulated MPEG-4 packet. In this example, a Pseudowire header 602 is pre-pended to packet 600. The Pseudowire header includes packet label information, which has the same format as the of an MPLS packet. In addition to the label information, several other fields are updated to provide information useful for the Application Wire. The sequence number field is used to keep packets in the application flow in the correct order. Ingress packets are assigned sequence numbers in the order they are received by the edge node. The EXP field is used to store service differentiation information such as priority level. The differentiation information is encoded according to the Internet Engineering Task Force (IETF)'s Request For Comments (RFC) 3270. The differentiation information, which is derived based on the service parameters associated with the application flow, gives service providers greater control over service quality for individual flows. In some embodiments, the reserved field in the control word is used for functions such as OAM (e.g. the VCCV function), service guarantee, protection, and flow control.

Since the resulting packet is an MPLS formatted packet, it can be processed by any intermediate nodes on the network (e.g. network routers and switches as) a regular MPLS packet. So long as the intermediate node is a standard MPLS enabled device, no modification is required of the device for processing an Application Wire related packet.

Figure 7:
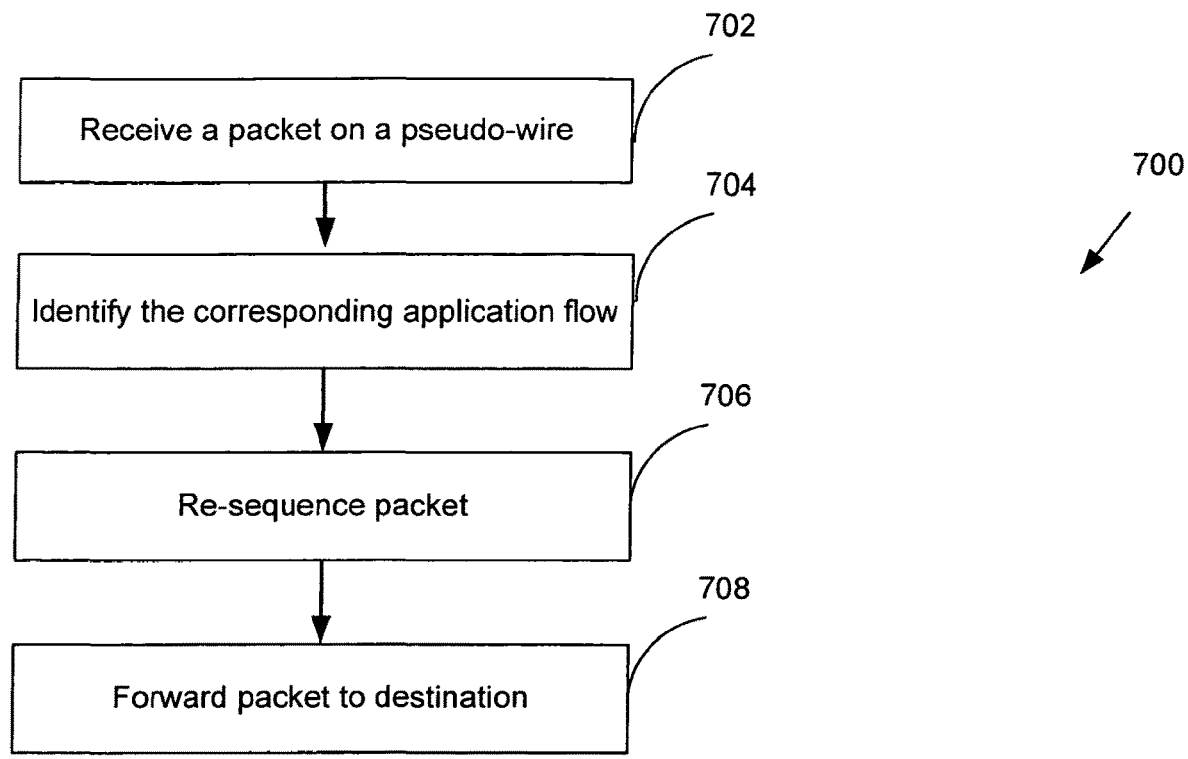
FIG. 7 is a flowchart illustrating an embodiment of a process for handling data traffic in the egress direction.

FIG. 7 is a flowchart illustrating an embodiment of a process for handling data traffic in the egress direction. Process 700 may be implemented on an edge node on the termination end of a Pseudowire. In this example, process 700 initiates when a packet is received on a Pseudowire (702). The application flow that corresponds to the Pseudowire is identified (704). In some embodiments, the identification is accomplished by looking up in a database that maps Pseudowires to application flows. In the event that the Pseudowire is configured to carry more than one application flow, the packet header is further inspected to locate the matching application flow.

Since it is possible for packets sent on different Pseudowires to arrive out of order, the packets are re-sequenced as appropriate (706). In some embodiments, the re-sequencing includes re-sequencing at the Pseudowire level. The sequence number field in the Pseudowire header is examined and used to sort the packets in the appropriate sequence. In some embodiments, the re-sequencing includes an application flow level re-sequencing. Application header and/or payload information is used to sort packets belonging to the same application flow in the appropriate order. For example, the SSRC and the sequence numbers in the RTP header, as well as the payload data are used in some embodiments to re-sequence an RTP flow. Once re-sequenced, the Pseudowire header of the packet is removed and the packet is forwarded to its destination (708).

Figure 8:
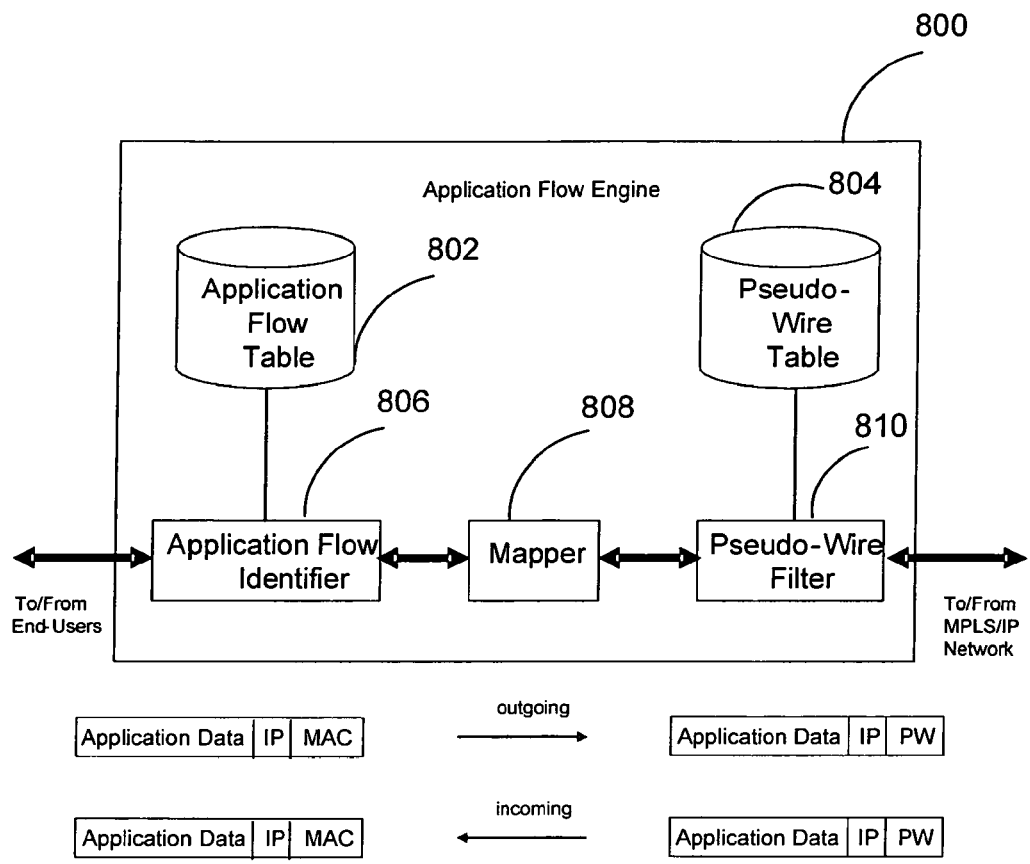
FIG. 8 is a block diagram illustrating an embodiment of an application flow engine.

In some embodiments, processes 300, 400 and 700 are carried out by an application flow engine (AFE). FIG. 8 is a block diagram illustrating an embodiment of an application flow engine. In this example, AFE 800 is included in an edge node device. The components of the AFE may be implemented as software, firmware, hardware or a combination thereof. The AFE is configured to send data streams from the client devices to the core network as well as to receive data streams from the network designated for client devices on the edge network.

When handling ingress data streams, the AFE identifies and maps application flows in the data streams to a plurality of Pseudowires. The application flows are denoted as $F=\{f.sub.1, f.sub.2, \ldots f.sub.n\}$ and the Pseudowires are denoted as $W=\{w.sub.1, w.sub.2, \ldots w.sub.m\}$. An application flow identifier 806 identifies new application flows in the data stream, and stores information associated with the application flows in a database labeled as an application flow table (AFT) 802. The AFT is also used to identify data packets that match application flows already stored in the AFT. Information stored in the AFT includes, among other things, flow identification information and service parameters. The flow identification information includes attributes used to identify the specific application flow and may vary depending on the application. For example, for an RTP-based application flow, the corresponding IP source and destination addresses, UDP protocol type, UDP source and destination port number, SSRC and CSRC are recorded in the AFT. Examples of the service parameters include various measured or assigned characteristics, such as the average and peak bandwidth of the flow, the burst size, the importance level of the flow (for example, emergency 911 traffic is assigned the highest importance and can preempt other flows at runtime), sub-flow information such as the bandwidth and importance levels associated with different sources, as well as other application dependent information such as whether to allow out-of-sequence packets in the flow. In some embodiments, at least a part of the AFT is populated ahead of time by the service provider. For example, the service parameters may be manually configured or populated using a configuration file when the system is initialized. Having a pre-populated AFT allows the service providers to offer different levels of services, and/or provide QoS guarantee based on subscription.

In FIG. 8, a mapper 808 maps incoming data packets to appropriate application flows if possible, and optionally performs admission control functions on the data flows. The mapper also maps each application flow to one or more Pseudowires based on information stored in a Pseudowire table (PWT) 804. A Pseudowire filter 810 encapsulates the packets with Pseudowire headers. The encapsulated packets are sent to the core network.

In some embodiments, the PWT maintains the network-bound Pseudowires, $W=\{w.sub.1, w.sub.2, \ldots w.sub.m\}$. For each Pseudowire, the following attributes are stored in one example: MPLS label for in packet encapsulation, QoS information indicating the level of QoS to be applied to the Pseudowire, Protection Path information identifying one or more backup Pseudowires used to protect this Pseudowire, OAM capability information used for error detection and loop-back, Multicast grouping information such as group ID used to transport multicast traffic over the MPLS/IP network.

When handling egress data streams, a process similar to 700 is carried out by the AFE. The PWT is used to look up the application flows that correspond to the packets received on various Pseudowires. The mapper re-sequences the packets, removes the Pseudowire headers, and forwards the packets to the destination.

The Application Wire techniques described above are also applicable for environments in which multimedia streams are multicasted to multiple sites in the network. To support multicast over Application Wires, a fully-meshed Pseudowire network for each multicast group is set up. Various mechanisms for supporting Pseudowire based multicast can be used, including Virtual Private LAN Service (VPLS) and IP LAN Service (IPLS).

Figure 9:
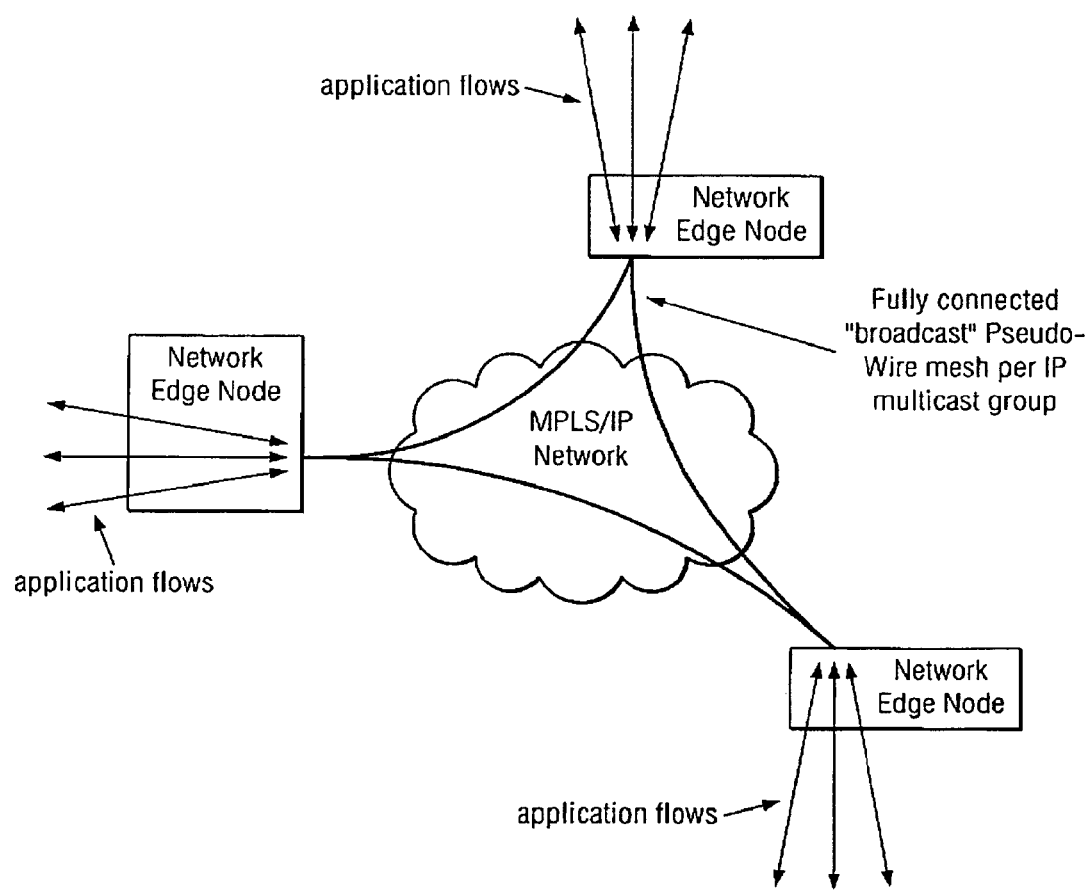
FIG. 9 is a diagram illustrating an example of a multicast environment supporting Application Wires.

FIG. 9 is a diagram illustrating an example of a multicast environment supporting Application Wires. In the example shown, application flow mapping is performed at any given network edge node, and a copy of the data packet is forwarded to all the other edge nodes in the group. In some embodiments, a packet is transmitted following these steps: for an application flow, $f.sub.i.sup.G$, that belongs to a multicast group, G, the PWT is searched and the adjacencies (i.e., the other edge nodes of the group denoted as $A.sub.k.sup.G, A.sub.k+1.sup.G \ldots$) are obtained. A copy of the data packet is sent to each adjacency. Between a pair of edge nodes (i.e., one adjacency), there may be multiple Pseudowires, $A.sub.k.sup.G=\{w.sub.j.sup.G, w.sub.j+1.sup.G \ldots\}$. As described above, an application flow may be split among the Pseudowires, according to application-specific parameters.

On an egress network edge node, the Pseudowire headers of the packets are removed, the packets are reassembled and/or re-sequenced as necessary, and forwarded to the destination. Any IP or Layer-2 multicast scheme may be used to forward the packets to a destination beyond the network edge nodes.

An Application Wire based data transfer technique has been described. The technique gives service providers greater flexibility in providing services based on applications, without requiring changes to intermediate devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   at a node associated with a multiprotocol label switching system (MPLS) network, performing:
   identifying information associated with an application flow based on one or more unencapsulated packet headers of the application flow or based on an ingress data stream that includes the application flow;
   in response to identifying the information, and based on stored data that maps application flows with psuedowires, determining a plurality of pseudowires corresponding to paths through the MPLS network, wherein the stored data indicates, for a sending device application, a distributed mapping of the application flow via at least one of the plurality of psuedowires; and
   communicating data related to the sending device application via at least one of the plurality of pseudowires.

2. The method of claim 1, wherein the stored data defines an application wire for use by the sending device application, the application wire configured to communicate particular data from a particular application flow of the sending device application to an edge node.

3. The method of claim 1, wherein the stored data further defines an application wire for use by the sending device application, the application wire configured to communicate particular data from an edge node through the MPLS network via the plurality of pseudowires.

4. The method of claim 1, wherein each of the plurality of pseudowires extends from the application flow in an ingress direction into the MPLS network.

5. The method of claim 1, wherein each of the plurality of pseudowires is virtually coupled between a particular device and a particular application being executed at a particular client device.

6. The method of claim 1, wherein the application flow includes data packets transmitted and received by the sending device application, wherein the data is communicated via the at least one of the plurality of pseudowires, and further comprising assigning, at an edge node, sequence numbers to ingress data packets in an order in which they are received by the node.

7. The method of claim 1, wherein the stored data maps the application flow to the plurality of pseudowires to create an application wire.

8. A device comprising:
a processor; and
a memory that stores instructions executable by the processor to:
identify information associated with an application flow based on one or more unencapsulated packet headers of the application flow or based on an ingress data stream that includes the application flow;
in response to identifying the information, and based on stored data mapping application flows to psuedowires, determine a plurality of pseudowires as paths through a multiprotocol label switching (MPLS) network for the application flow, wherein the stored data indicates, for a sending device application, a distributed mapping of the application flow via at least one of the plurality of psuedowires; and
communicate data associated with the sending device application via at least one of the plurality of pseudowires.

9. The device of claim 8, wherein the stored data defines an application wire for use by the sending device application, the application wire configured to communicate particular data from a particular application flow of the sending device application to an edge node.

10. The device of claim 8, wherein the stored data further defines an application wire for use by the sending device application, the application wire configured to communicate particular data from an edge node through the MPLS network via the plurality of pseudowires.

11. The device of claim 8, wherein each of the plurality of pseudowires extends from the application flow in an ingress direction into the MPLS network.

12. The device of claim 8, wherein each of the plurality of pseudowires is virtually coupled between a particular device and a particular application being executed at a particular client device.

13. The device of claim 8, wherein:
the application flow includes data packets transmitted and received by the sending device application,
the data is communicated via the at least one of the plurality of pseudowires, and the instructions are executable by the processor to cause assigning, at an edge node, of sequence numbers to ingress data packets in an order in which they are received by the node.

14. The device of claim 8, wherein the stored data maps the application flow to the plurality of pseudowires to create an application wire.

15. A computer-readable non-transitory medium storing instructions that are executable by a processor to initiate or perform:
identifying information associated with an application flow based on one or more unencapsulated packet headers of the application flow or based on an ingress data stream that includes the application flow;
in response to identifying the information, and based on stored data that maps application flows with psuedowires, determining a plurality of pseudowires corresponding to paths through a multiprotocol label switching system (MPLS) network, wherein the stored data indicates, for a sending device application, a distributed mapping of the application flow via at least one of the plurality of psuedowires; and
communicating data related to the sending device application via at least one of the plurality of pseudowires.

16. The computer-readable non-transitory medium of claim 15, wherein the instructions are executable to perform the identifying, the determining, and the communicating at a node associated with the MPLS network.

17. The computer-readable non-transitory medium of claim 15, wherein the stored data defines an application wire for use by the sending device application, the application wire configured to communicate particular data from a particular application flow of the sending device application to an edge node.

18. The computer-readable non-transitory medium of claim 15, wherein the stored data further defines an application wire for use by the sending device application, the application wire configured to communicate particular data from an edge node through the MPLS network via the plurality of pseudowires.

19. The computer-readable non-transitory medium of claim 15, wherein each of the plurality of pseudowires extends from the application flow in an ingress direction into the MPLS network.

20. The computer-readable non-transitory medium of claim 15, wherein each of the plurality of pseudowires is virtually coupled between a particular device and a particular application being executed at a particular client device.

* * * * *